United States Patent [19]

Baird

[11] Patent Number: 4,962,395

[45] Date of Patent: Oct. 9, 1990

[54] LIQUID LEVEL SENSOR WITH WIDE TEMPERATURE RANGE CAPACITY

[75] Inventor: Alistair R. W. Baird, Scotland, United Kingdom

[73] Assignee: Honeywell Control Systems Limited, United Kingdom

[21] Appl. No.: 280,626

[22] Filed: Dec. 6, 1988

[30] Foreign Application Priority Data

Dec. 11, 1987 [GB] United Kingdom ............... 8729038

[51] Int. Cl.⁵ .......................................... G08B 21/00
[52] U.S. Cl. .................................. 340/619; 73/293; 356/436; 356/135; 250/903; 250/577
[58] Field of Search .............. 340/619, 620; 73/705, 73/293; 250/577, 903; 356/133, 436, 440, 128, 134–136; 357/19

[56] References Cited

U.S. PATENT DOCUMENTS

| | | | |
|---|---|---|---|
| 4,132,899 | 1/1979 | Shigemasa et al. | 250/577 |
| 4,246,489 | 1/1981 | Yoshida et al. | 250/577 |
| 4,878,383 | 11/1989 | Wiegand, Jr. et al. | 73/293 |
| 4,912,319 | 3/1990 | Miyata et al. | 250/577 |

FOREIGN PATENT DOCUMENTS 0035042  4/1981  Japan .................... 356/128

Primary Examiner—Joseph A. Orsino
Assistant Examiner—Jill Jackson
Attorney, Agent, or Firm—Clyde C. Blinn

[57] ABSTRACT

A liquid level sensor comprises a light source in the form of a semiconductor device, a light sensor also in the form of a semiconductor device, and an optical element arranged to transmit light from the light source and to receive reflected light and transmit it to the light sensor, the liquid level sensor further comprising a carrier having gas-filled cavities means in which the light source and the light source and the light sensor are respectively mounted, the cavities being separated by barrier means to prevent scattered light reaching the light sensor from the light source. The mounting of the light source and light sensor in gas-filled cavities extends significantly the operating temperature range of the liquid level sensor.

21 Claims, 4 Drawing Sheets

LIQUID LEVEL SENSOR WITH WIDE TEMPERATURE RANGE CAPACITY

The present invention relates to liquid sensors, and especially but not solely liquid level sensors.

It is well known to sense the level of a liquid by means of an optical probe comprising a transparent optical element, a light source and a light sensor. Light from the light source passes into the optical element and is refracted therefrom into the liquid and dissipated if the element is immersed in the liquid but reflected back therein and detected by the light sensor if the element is not immersed in the liquid. This arrangement relies principally on the fact that much of the light undergoes total internal reflection in the optical element when the element is out of the liquid but that the refractive index between the element and the liquid is much lower than that between the element and air and hence relatively little light is reflected when the element is immersed in the liquid.

. Such a known construction is relatively cumbersome and expensive and a more compact probe is disclosed in Applicant's EP-A-0229960. In this compact arrangement, which is easier to construct than the previous probes, the light source and the light sensor are both semiconductor devices encapsulated in the transparent synthetic plastics material and mounted on leads projecting from the encapsulating material. Such a probe has been found to be generally satisfactory although it has been discovered that it has an operating temperature range of the order of −20° C to 85° C, partly due to the on the integrated circuit boards, and partly due to the stresses imparted to the electrical connection arising from relative expansion and contraction of the encapsulation and electrical connections (typically gold wires) resulting in mechanical failure. Accordingly, the probe of EP-A-0229960 is not appropriate for use in all temperature environments. These problems may be overcome by using the hermetic sealing technique discussed above but, as commented, this increases significantly the cost of the device. Therefore, it is an object of the present invention to extend the operating temperature range of a liquid level sensor without increasing significantly the cost thereof.

According to the present invention there is provided a liquid sensor characterised by a semiconductor light source and a semiconductor light detector mounted on a common support means, the light source and the light detector are located on a plane parallel to and closely spaced from the major plane of an optical element of hemispherical or generally hemispherical, shape, and the light source and light detectot are located in a straight line passing through the symmetry axis of the optical element and parallel to a diagonal of the circle described by the optical element in its major plane, whereby the optical element is able to receive light output from the light source and to transmit the light towards an arcuate boundary of the optical element, and the optical element is also able to transmit light which is reflected at its arcuate exterior boundary in the absence of liquid at the exterior of the optical element and to direct it towards the inlet part of the light detector, the sensor comprising enclosed, gas-filled cavity means to accommodate the light source and detector. In this way, the cavity means can inhibit the effects of sensor ambient temperature on one or more of the semiconductor light source and detector and/or the electrical connections thereof.

Thus, it has been found that by adopting the simple expedient of dispensing with the encapsulation around the light source and the light sensor used in the liquid level sensor disclosed in EP-A-0229960 and mounting the light source and light detector in gas-filled cavity means, preferably respective cavities, the operating temperature range of the liquid level sensor is extended from −20° C to 85° C, to −50° C. to 150° C, this extension of the operating range being extremely significant and making the liquid level sensor appropriate for use in severe temperature environmental conditions such as, for example, are experienced in aerospace and military applications.

The optical element may comprise a solid body of hemispherical or generally hemipherical shape; alternatively it may comprise a domed body with a recessed interior, the body having an exterior of hemispherical, or generally hemispherical shape.

The cavity means in which the light source and light sensor are disposed are preferably filled with air but may be filled with nitrogen or an inert gas, for example, although ideally this would require the cavity means to be hermetically sealed and hence increase the cost of the sensor. It is believed that the size of the cavity means relative to the liquid sensor itself is not very significant, but an important aspect is that the semiconductor light source and detector and the wire bonds are free of encapsulation material.

Preferably, the cavity means is located intermediate the optical element and the semiconductor light source and/or detector, to accommodate electrical connections of the source and/or detector. In this way, the risk of breakage of the wire bonds by expansion of material in which they are embedded is effectively eliminated.

Also, the semiconductor light source and light detector may be located on their common line at different distances from the intersection point with the symmetry axis of the optical element, advantageously the semiconductor light source being spaced further from the intersection point than the semiconductor light detector. Such positioning has been determined as being very beneficial.

Preferably, the semiconductor light detector incorporates means for processing signals received at the detector.

Preferably, the common support means comprises a leadframe; it has been discovered that such an assembly is particularly convenient for precision positioning and for use generally, while being simple and low-cost to manufacture.

The present invention also provides a method of manufacturing a liquid sensor characterised by moulding or otherwise forming a support means with at least one recess for accommodating one or more semiconductor components, and then attaching a semiconductor light source and a semiconductor light detector into one or more recesses in the support means, and securing the support means in relation to an optical element of hemispherical, or generally hemispherical, shape, whereby the light source and the light detector are located on a plane parallel to and closely spaced from the major plane of the optical element and the light source and light detector are located in a straight line passing through the symmetry axis of the optical element and parallel to a diagonal of the circle described by the optical element in its major plane such that the optical element is able to receive light output from the light source and to transmit light which is reflected at its arcuate exterior boundary in the absence of liquid at the exterior of the optical element and to direct it towards the inlet port of the light detector, and whereby the sensor comprises enclosed, gas-filled cavity means accommodating the light source and the light sensor.

Preferably the method includes forming cavity means comprising a cavity to accommodate the light source and a separate cavity to accommodate the light detector and, advantageously, forming cavity means located intermediate the optical element and the semiconductor light source and/or detector, to accommodate electrical connections of the source and/or detector.

The method may include locating the light source and the light detector on their common line at different distances from the intersection point with the symmetry axis of the optical axis, and preferably by locating the light source further from the intersection point than the light detector.

According to another aspect, the present invention provides a method of manufacturing a liquid sensor characterised by moulding plastics material onto and around a network of electrically conductive elements (preferably a leadframe) thereby to form a support means with at least one recess for accommodating one or more semiconductor components, then attaching a semiconductor light source and a semiconductor light detector into one or more recesses in the support means, and thereafter completing manufacture of the liquid sensor.

There is shown in FIG. 3 of DE-OLS 2920199 a liquid level sensor which comprises a light source 12 and a light detector 18 located on a printed circuit board 30 in a space 30. However, this arrangement is wholly different from the present invention for numerous reasons. Firstly, that the design is not intended to be used with semiconductor devices as there is no capability for precision positioning (note, for example, the use of a printed circuit board as a holder for the light source and detector), this being most when using semiconductor devices, as the applicant has out. Moreover, the space 30 is open to the environment, and therefore it cannot function as, and will not achieve the temperature effects of, the enclosed cavity means of the present invention. Moreover, the optical element 4 is not hemispherical, and the light source and detector are not closely located to it, so that the liquid level sensor is in no way compact. Thus in summary, the disclosure of DE-OLS 2920199 is not pertinent to the present invention and a skilled man in the art would dismiss its teachings when considering the problems with which the present invention is concerned.

A liquid level sensor in accordance with the present invention will now be described in greater detail, by way of example, with reference to the accompanying drawings, in which.

Figure 1:
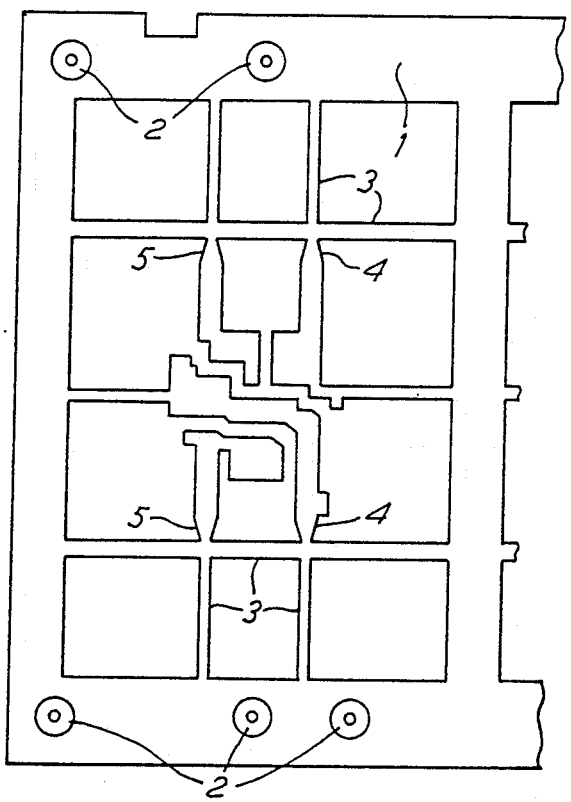
FIG. 1 is a plan view of a component of the liquid level sensor.
Figure 2:
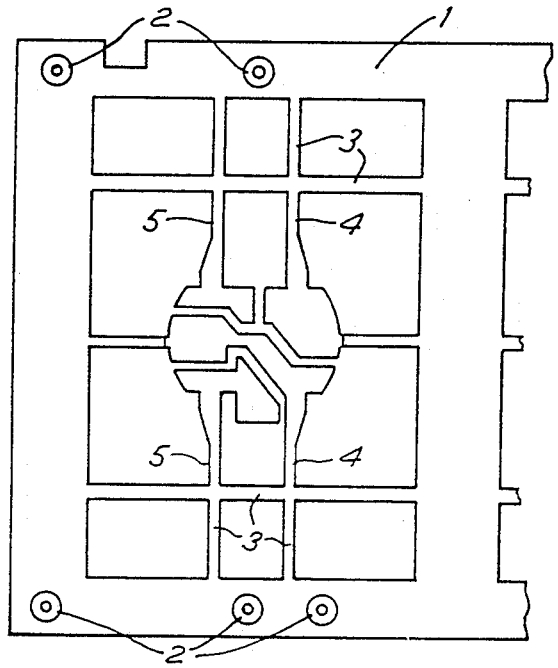
FIG. 2 is a plan view of an alternative form of that component of the liquid level sensor.

The liquid level sensor of the illustrated embodiment is basically similar to that disclosed in EP-A-0229960, the disclosure of which is incorporated herein by reference. Referring first to FIG. 1 of the accompanying drawings, the operational components of the liquid level sensor are formed on a leadframe blank 1 provided with alignment holes 2 and comprising a framework of leads 3 which are broadened in four places to provide two pairs of connection lugs for electrodes 4 and 5 in the central area of the blank 1. The leadframe, produced by stamping or etching, may consist of a plurality of frames each of the design shown, or a single frame of that design, to suit the manufacturing volumes required. FIG. 2 shows an alternative design of leadframe which has enlarged connection pads particularly suited to a specific manufacture process to be described hereafter.

Figure 3:
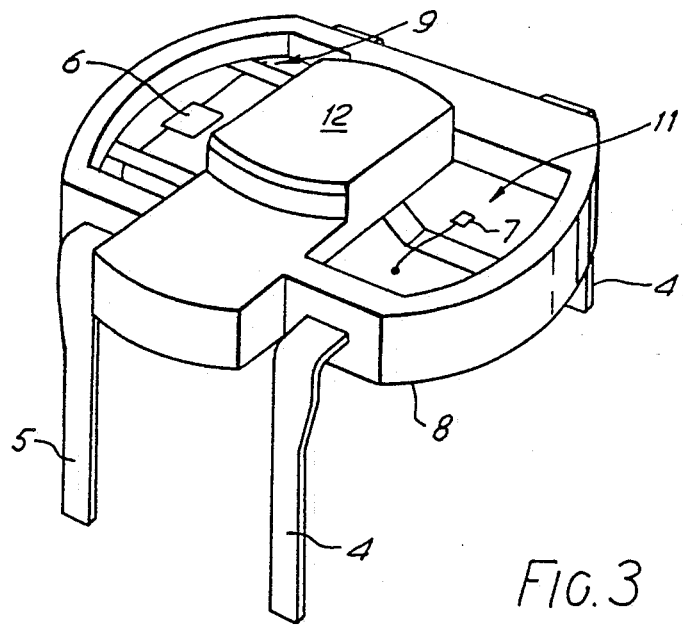
FIG. 3 is a perspective view of part of the liquid level sensor.
Figure 4:
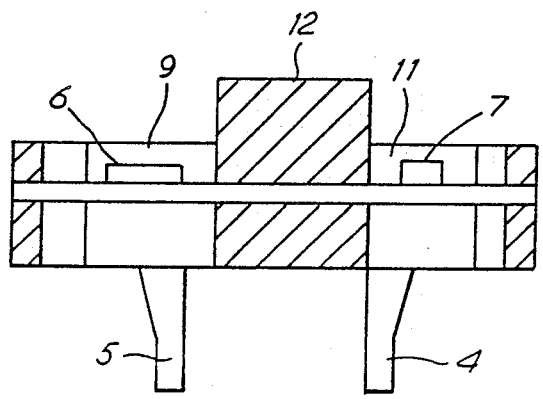
FIG. 4 is a cross-sectional view of that part of the sensor shown in FIG. 3.

By suitable assembly processes to be described hereafter, a light or detector semiconductor chip 6 and a light source in the form of a light-emitter semiconductor chip 7 are mounted on respective electrodes and connected to the electrodes by thin wires (not shown) in a carrier 8, with the electrodes being bent back away from the light sensor and the light source. The carrier 8 is illustrated in FIGS. 3 and 4 of the drawings and it will be seen that cavities 9 and 11 are provided in which the light sensor and light emitter 6 and 7 are respectively mounted. The carrier 8 is provided with a raised central portion 12 to act as a locating element and barrier for a purpose to be described. The electrodes 4 and 5 are bent at right angles to the plane of the basic blank 1.

Figure 5:
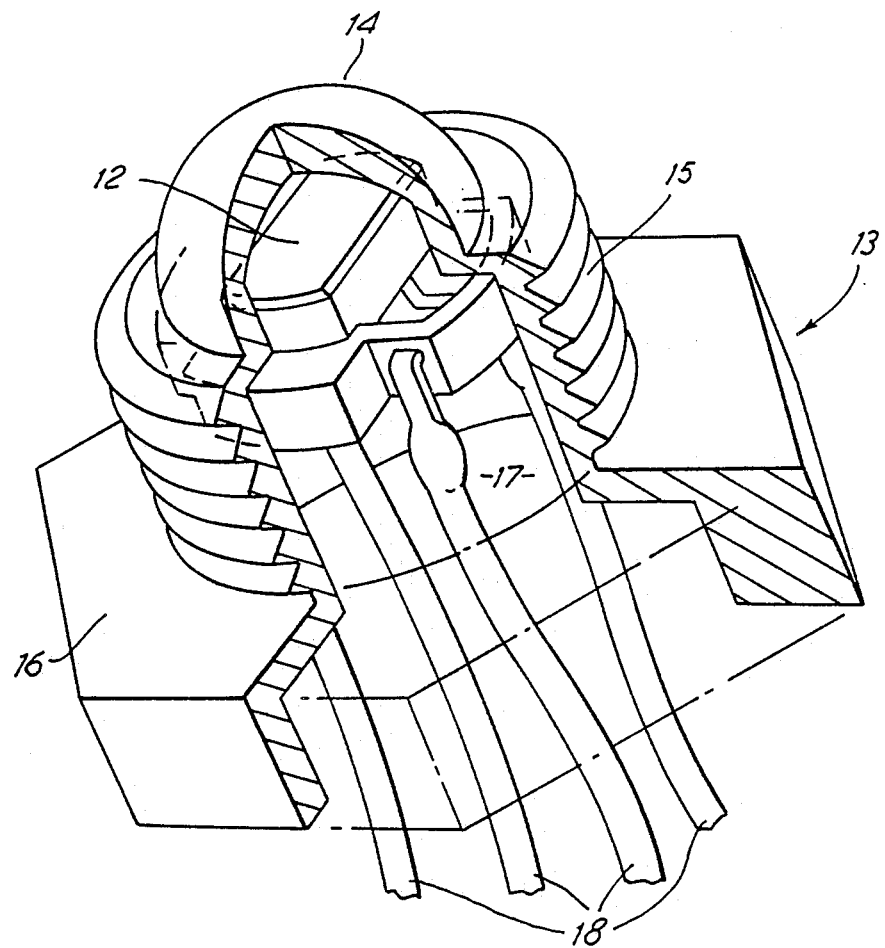
FIG. 5 is a perspective view, partly cut away, of the completed liquid level sensor.
Figure 6:
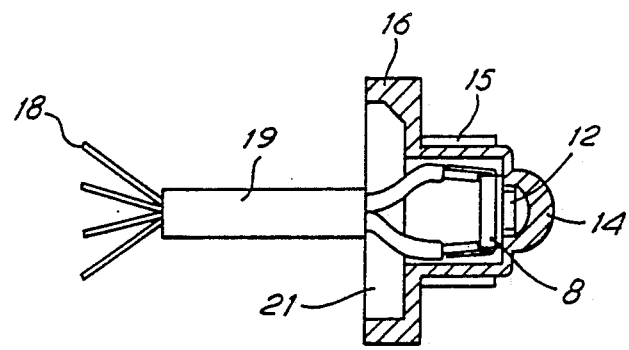
FIG. 6 is a cross-sectional view of the completed liquid level sensor.

The liquid level sensor is completed by an optical element in the form of an optically transparent cover 13 for the carrier 8 as illustrated in FIGS. 5 and 6 of the drawings. The raised central portion 12 of the carrier 8 locates the latter in the cover 13. It will be appreciated that, when the carrier 8 and the cover 13 are assembled together, the light sensor and light emitter 6 and 7 are contained within respective closed cavities and that the cavities 9 and 11 of the carrier 8 are closed by associated portions of the cover 13. Thus the device is not optically uniform, whereby the cavities are separated by the central portion 12 which prevents light from the emitter 7 scattered at the boundaries of differing refractive indices reaching the light sensor 6.

The cover 13 is of a transparent synthetic plastics material and comprises a domed optical element 14 of generally hemispherical shape, a threaded portion 15, a flange 16 (which is preferably formed as a nut), and a bore 17; clearly much of the exterior form of the cover, for example the threaded portion 15 and flange 16, is wholly dependent on the use to which the sensor is applied, and so can designed to suit the customer's purpose and requirements. The bore 17 is shaped so as to accommodate the carrier 8 which fits snugly at the end of the bore. Connections are made to the electrodes 4 and 5 by wires 18 of a cable 19, and the operational components are held and sealed in the bore 17 by means of a transparent synthetic plastics potting material 21.

The optical element shown in FIGS. 5 and 6 is arranged such that light passes from the light source 6 to the sensor 7 by means of internal reflection from the spherical surface. In liquid, there is little such reflection, most of the light passing into the liquid by refraction: in air, there is high internal reflection. The hemispherical surface, with the light source 6 and light sensor 7 placed on opposite sides of the centre of the hemisphere, gives good focusing of the light from the source to the sensor when the element is not in liquid.

Carrier 8 and cover 13 are positioned relative to one another such that the bases of light sensor 6 and light source 7 are located on carrier 8 on a plane which is parallel to the major plane, in this instance the exterior face not constituting the hemispherical exterior, of optical element 8. Moreover the light sensor and light source lie on a straight line which passes through the symmetry axis of the optical element 14 and is parallel to a diagonal of the circle describing the hemispherical exterior and lying in the major plane of optical element 14.

Figure 7:
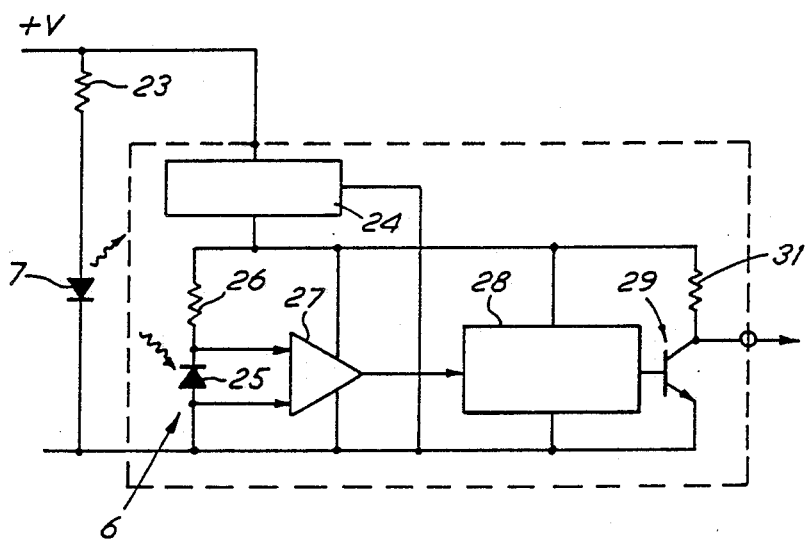
FIG. 7 is a circuit diagram of the liquid level sensor.

FIG. 7 of the drawings shows the circuitry of the liquid level sensor, the light-emitter 7 being a gallium arsinide or gallium aluminium arsinide light-emitting diode which is connected in series with a current limiting and adjusting resistor 23. The light 6 incorporates, in an integrated circuit C, a voltage regulator 24 and a light-responsive diode 25 which is connected in series with a resistor 26 and feeds an operational amplifier 27, the output of which is applied to an opto-Schmitt trigger circuit 28. The output of the opto-Schmitt trigger circuit 28 is applied to the base of a transistor 29 from the collector resistor 31 of which the output is taken.

In use, the liquid level sensor is mounted as required to sensor the level of liquid in a container and the light sensor 6 and light-emitter 7 are energised from an external source via the cable 19. Thus, the light-emitter 7 transmits light through the optical element 14 into the container and if the optical element is immersed in the liquid being sensed, then the transmitted light from the light-emitter 7 is refracted and virtually no reflection takes place back through the optical element to the light sensor 6. However, if the optical element 14 is not immersed in the liquid being sensed, then light transmitted from the light emitter 7 is reflected back to the light sensor 6. Accordingly, the output of the light sensor 6 indicates whether or not the liquid level sensor is immersed in the liquid the level of which is being sensed. The liquid level sensor is a digital device giving a high output in air and a low output in liquid.

By the provision of the light sensor 6 and light-emitter 7 in gas-filled cavities 9 and 11, it has been found, as already mentioned, that the operating and storage temperature range of the liquid level sensor is dramatically increased from a range of $-20°$ C to $85°$ C to a range of $-50°$ C to $150°$ C. The extension of the operating and storage temperature range of $30°$ C at the lower end and $65°$ C at the upper end represents a significant advance in the art and permits the liquid level sensor of the present invention to be used in severe temperature environments not open to liquid level sensors of the prior art.

It is considered that the relative size of the cavities in relation to the size of the sensor is not of primary concern in implementation of the invention; it is more important, in order to provide improved temperature performance of a liquid level sensor, that stress effects of encapsulation material on the integrated circuit blocks and the wire bonds are prevented by maintaining them free of such material.

It will be appreciated that the custom-made semiconductor represents first-level packaging compared with off-the-shelf components, whereby considerably smaller liquid level sensor are produced.

It has been found that the positioning of the light source and the light sensor relative to the optical element is most important in order to optimise the operation of the liquid level sensor. The utilisation of semiconductor light source 6 and semiconductor light sensor 7 in the carrier 8 enables the position of these components to be much more precisely located in relation to the optical element, in a design suited to mass-production, than has hitherto been possible in more conventional equipment. For example, in conventional liquid level sensor equipment not using semiconductor light source and sensors, the output area of the light source is about 4 or 5 $mm^2$ and likewise for the input area of the light sensor; however, the semiconductor light source and light sensor used in the invention have an output area of 0.3 $mm^2$ and an input area of 0.5 $mm^2$ respectively, thereby requiring them to be very accurately positioned for optimal effective operation of the liquid level sensor.

The Applicant has determined a number of features relating to the positioning of the components of the liquid level sensor, which features are wholly unexpected from the state of the art and which are very important in order to design an effective liquid level sensor.

Substantial experimentation and analysis has been done on appropriate positioning of the light source and light sensor, and this has indicated that the closer that the light source and the light sensor are disposed to the optical element (in order to render the liquid level sensor as compact as possible), then the more critical is it to ensure that the light sensor is in the correct position. If it is not in the correct position, then internally reflected light is not detected and the liquid level sensor can give a false reading.

Moreover, it has been discovered that placing the light source further from the symmetry axis of the optical element than the light sensor enhances operation of a liquid level sensor embodying the present invention.

Furthermore, it has been discovered that the preferred positions of the light source 7 and light sensor 6 are such as to be on the plane parallel to, and their bases spaced about 1 mm from, the major flat surface of the optical element 14 and at a distance from the intersection point with the symmetry axis in the range 60% to 80% of the radius of the hemisphere describing the optical element. This is contrary to some conventional liquid level sensors, wherein the light source and sensor are arranged to be close (substantially less than 50% of the radius) to the symmetry axis.

From extensive analysis and experimentation, it has been determined that a preferred arrangement is to have the light source located between 70% and 80% of the radius distant from the symmetry axis and the light sensor between 60% and 70% therefrom; in a particularly advantageous arrangement, the values are 75% and 65% respectively. In an advantageous example of the illustrated design, the light source 7 and light sensor 6 are located on carrier 8 on a plane parallel to and substantially 1 mm from the major flat surface of optical element 14 which has a radius of 3.5 mm, the light source 7 being centred at a distance of 2.625 mm (i.e. 75% of the radius) from the symmetry axis and the light sensor is centred at a distance of 2.275 mm (i.e. 65% of the radius) from that axis.

For a liquid level sensor essentially of the same design except for omitting the cavity means, the light source and light sensor may again be positioned between 60% and 80% of the radius, but this time a preferred range for the light source is 60% to 70%, and for the light sensor is 65% to 75%, the particularly advantageous values being 65% and 70% respectively. Thus in an advantageous example similar to the illustrated design except that the cavities are omitted, the light source and light sensor are on a plane parallel to and substantially 1 mm from the major flat surface of the optical element of radius 3.5 mm, the light source being centred at a distance of 2.27 mm (i.e. 64.9% of the radius) from the symmetry axis and the light sensor is centred at a distance of 2.47 mm (i.e. 70.1% of the radius) from that axis. Thus in this instance, positioning the light sensor further out than the light source provides improved operation.

Thus the Applicant has determined that the provision of cavities requires the light source to be further out than the light sensor for efficient operation of the sensor, this being the opposite arrangement to that preferred for the liquid level sensor without the cavities. It is believed that this is because the presence of cavities accommodating the light sensor and detector means that the light passes through two additional interfaces, and particularly the plastic-air interface close to the sensor which affects significantly the direction of the light path. Thus the Applicant has determined an arrangement of light source, light sensor and carrier novel and unobvious over conventional liquid level sensors.

Considering now the operation of the liquid level sensor, if $\alpha_1$ is the critical angle (with respect to the normal of any point of the hemispherical exterior of optical element 14) in the presence of liquid, and $\alpha_2$ is the critical angle (with respect to that normal) in the of air, then it is of principal importance to the operation of the liquid level sensor that it monitors for those beams which strike the hemispherical boundary at angles greater than $\alpha_2$ but less than $\alpha_1$.

The light from light source 7 output into the optical element 14 constitutes four types of beams as concerning their relevance to the function of the liquid level sensor, namely: beams of light ($L_0$) which always escape (i.e. those with angles less than $\alpha_2$); beams of light ($L_2$) which escape from the optical element only in the presence of water (i.e. those with angles greater than $\alpha_2$ and less than $\alpha_1$); teams of light ($L_2$) which are internally reflected at the arcuate boundary whether in air or water (i.e. those with angles greater than $\alpha_1$) and beams of light ($L_3$) which do not reach the arcuate boundary due to prior reflection or scattering. The light source and sensor are positioned relative to the optical element in order to maximise $L_1$ received at light sensor 6 while minimising $L_0$, $L_2$ and $L_3$, in order to provide optimum coupling difference between air and liquid for minimal power input to light source 7.

Consideration of this analysis highlights the fact that it is wholly different to the analysis necessary for determining the appropriate positioning of components in an optical coupler, wherein the above-mentioned categorisations $L_0$, $L_1$ and $L_2$ have no meaning and it is merely necessary to position the components such that the amount of the light (other than $L_4$) is received at the light sensor. Accordingly, the teachings of optical coupler technology are of no relevence to the present invention, and this point would be evident to a person skilled in the art when considering the problem with which the invention is concerned. Substantial testing of the liquid level sensors embodying the present invention showed their capability of operating over a temperature range substantially larger than that of conventional equipment. The testing included the following procedures:

1. Storage Temperature Testing

Five samples of liquid level sensors embodying the invention and as illustrated and described hereinabove were left in an environmental chamber unpowered at $-50°$ C for a period of 12 hours; they were then removed and left in ambient for a short period and tested. The samples were then placed in a chamber at $+150°$ C for a further 12 hours, after which they were removed and left in ambient for a short period, and again tested. All samples survived 10 complete cycles.

2. Thermal Cycle Testing

Five samples were subjected to the following thermal cycle:
 (i) $+25°$ C, 10 minutes maximum Duration to
 (ii) $+125°$ C, maximum 15 minutes Duration to
 (iii) $+25°$ C, 5 minutes Duration to
 (iv) $-40°$ C, 15 minutes Duration
 (v) $+25°$ C, 10 minutes Duration The rate of change of temperature was 1° C/Min. All samples survived 10 complete cycles.

3. Thermal Shock Testinq (A) Air Shock

Five samples were tested in air over the following cycle:
 (i) $+20°$ C, 1 minute Duration to
 (ii) $+125°$ C, maximum 15 minutes Duration to
 (iii) $+20°$ C, 1 minute Duration to
 (iv) $-40°$ C, minimum 15 minutes Duration to
 (v) $+20°$ C, minimum 1 minute Duration The transfer time temperatures was less than 5 seconds. All samples survived 20 complete cycles.

(B) Liquid Shock

Five samples were transferred from a high temperature Liquid Bath at 105° C to a low temperature Liquid Bath at $-20°$ C. The transfer time was less than 5 seconds with a 1 minute dwell at each temperature. After 15 complete cycles all samples operated according to operational requirements (liquid used: Dialia Oil Grade B).

4. Humidity Testing

Five samples were subjected to the following temperature humidity cycle:

| | | | |
|---|---|---|---|
| 1. | 25° C. | Ramp to 65° C. | In ½ hour maximum |
| 2. | 65° C. | Hold | For 3 hours minimum |
| 3. | 65° C. | Ramp to 25° C. | In ½ hour maximum |
| 4. | 25° C. | Ramp to 65° C. | In ½ hour maximum |
| 5. | 65° C. | Hold | For 3 hours minimum |
| 6. | 65° C. | Ramp to 25° C. | In ½ hour maximum |
| 7. | 25° C. | Hold | For ½ hour approximately |
| 8. | 25° C. | Ramp to $-10°$ C. | In ½ hour maximum |
| 9. | $-10°$ C. | Ramp to 25° C. | In ½ hour maximum |
| 10. | 25° C. | Hold | For ½ hour maximum |

For steps 1 to 6, RH=90% minimum Value.
For steps 7 to 11, RH=Uncontrolled.
All samples survived 5 complete cycles.

The above tests show that a sensor embodying the present invention can readily operate in the temperature range $-40°$ C to 125° C, the limitations on operating with temperatures outside this range in the test being due merely to the operating parameters of the electronic in the specific example and not to the operational limitations of features crucial to the invention. Thus it is envisaged that with appropriate selection of electronic components whose range of operation extends substantially outside the range mentioned, the design which embodies the present invention will enable the liquid level sensor to operate in a substantially extended temperature range. Certainly, the design of liquid level sensor embodying the present invention can readily be stored in the range −50° C to 150° C without the occurrence of any harmful effects, e.g. damage to the integrated circuits and/or the wire connections which are prevalent in liquid level sensors without the facility of the cavities.

When doing the analysis of light source/sensor position to optimise the operation of the liquid level sensor, the intention is to maximise the light coupled in air and minimise the light coupled in liquid. In this way, when setting the operational coordinations for the liquid level sensor, one can attempt to use the minimum current which provides a signal in the absence of liquid, so that the operating power for the sensors can be kept to a minimum which has substantial benefits in increasing the life of the liquid level sensor.

For a liquid level sensor of the illustrated design and with the values mentioned hereinbefore, the device can couple at 4 mA upwards, and operates typically at 40 mA. A liquid level sensor which differs only by omission of the cavities has similar values. Both designs have substantially improved performances over prior art liquid level sensors whose operating currents are typically two or three orders of magnitude greater.

Moreover, a liquid level sensor of the illustrated design embodying the present invention is substantially more compact than a conventional sensor; for example the minimum overall size of the complete unit of a sensor embodying the present invention is 10 mm by 6 mm whereas conventional types of sensor tend to be considerably larger.

Similarly, a sensor of similar design to that illustrated except for the omission of cavities is likewise favourably comparable in compactness to conventional sensors.

The utilisation of a semiconductor light source 7 light sensor and the carrier 8 enables a much greater degree of contact over the geometry of the components making up the sensor than has previously been possible, and therefore it is feasible to improve the efficient operation. However, the more precise input part of the light sensor requires much more accurate positioning of it than has hitherto been necessary, and therefore the Applicant has had to do substantial innovative development work which has produced a set of most unusual and unexpected results not apparent from the prior art. The resultant design is readily susceptible to mass-production, while maintaining very high standards of efficient operating performance and long life.

Manufacture of the illustrated design of liquid level sensor is as follows. Plastics material is moulded around leadframe 1 such as to form a carrier 8 while maintaining uncontaminated those areas which are to accommodate the integrated circuits (and their environs) and protecting the gold-plated areas of the cavities; the clamping pressure used is greater than the transfer pressure, and using a material with a long spiral flow so that the moulding can be done under low transfer pressure and speed to reduce the likelihood of contamination. The integrated circuit blocks comprising light sensor 6 and light source 7 are and mechanically and electrically attached to the carrier 8 and leadframe 1 by appropriate use of gold-loaded epoxy or non-conductive epoxy. Then the wire-bonding and cropping operations are performed, and wires attached to electrodes 4 and 5. The resultant flat-pack is then inserted into a pre-moulded cover 13, the raised central portion 12 of the flat-pack acting to locate it in approximately the correct position within cover 13, and then the flat-pack is oriented to assume the optimum predetermined position, the two parts being mechanically secured with epoxy material of the same value of refractive index as the cover 13.

This process provides a simple, fast moulding operation which does not require precise accuracy, avoids harm to the integrated circuit blocks used and effectively avoids problems concerning contamination by the moulding material. Moreover, it is suited to mass-manufacture. The process is wholly different to conventional liquid level sensor manufacturing techniques wherein the integrated circuit blocks 6 and 7 are attached to the leadframe 1 before the carrier 8 is moulded thereon.

In an alternative, the integrated circuit blocks including light sensor 6 and light source 7 are attached to the leadframe by eutectic bonding and then whilst they and the surrounding regions (which will in due course constitute the cavities) are protected, plastics material is moulded onto the leadframe to form carrier 8. The wire bonding operation and the subsequent steps are then performed as for the manufacturing process described above. The eutectic bonding step involves a temperature of the order of 300° C requiring it to be carried out prior to the moulding of the carrier;

eutectic bonding the life of the senor as it provides for improved thermal conductivity and therefore reducing the junction temperatures.

The design of leadframe 1 shown in FIG. 2 is particularly suited for use in both manufacturing processes mentioned above.

The above manufacturing processes are faster and of lower cost than a process for manufacturing conventional liquid level sensors of the encapsulated design, because the omission of the encapsulated stage allows a substantial reduction in the overall cycle-time of the process (for example up to a factor of four shorter). Moreover, the above processes provide a substantially higher yield than those of the conventional encapsulation type sensors, as there is less stress on the various components (especially the integrated circuit blocks, the electrodes and any wire bonds) during the manufacture process as a whole, and in particular the most stressful stage (i.e. the encapsulation operation) is omitted.

I claim:

1. A liquid sensor characterised by a semiconductor light source and a semiconductor light detector mounted on a common support means, an optical element of hemispherical, or generally hemispherical shape, the light source and the light detector being located on a plane parallel to and closely spaced to a major plane of the optical element said major plane constituting a cross-section of substantially maximum area of the optical element and in a base region thereof and the light source and light detector being located in a straight line passing through a symmetry axis of the optical element and parallel to a diameter of a circle described by the optical element in its major plane, the light source and light detector being located on said straight line at different distances from an intersection point with said symmetry axis of the optical element, whereby the optical element is able to receive light output from the light source and to transmit the light towards an arcuate exterior boundary of the optical element, and the optical element is also able to transmit light which is reflected at said arcuate exterior boundary in the absence of liquid at the exterior of the optical element and to direct it towards an inlet port of the light detector, the sensor comprising enclosed, gas-filled cavity means to accommodate the light source and detector.

2. A liquid sensor according to claim 1, wherein the cavity means comprises a cavity to accommodate the semiconductor light source and a separate cavity to accommodate the semiconductor light detector.

3. A liquid level sensor according to claim 1, wherein the cavity means is located intermediate the optical element and the semiconductor light source and detector, to accommodate electrical connections of the source and detector.

4. A liquid sensor according to claim 1 wherein the light source and the light sensor are located on said straight line at a distance from said intersection point with said symmetry axis in the range 60% to 80% of a radius of said circle.

5. A liquid sensor according to claim 1, wherein the semiconductor light source is spaced further from the intersection point than the semiconductor light detector.

6. A liquid sensor according to claim 1, wherein the semiconductor light detector incorporates means for processing signals received at the detector.

7. A liquid sensor according to claim 1, wherein the common support means comprises a leadframe.

8. A liquid sensor according to claim 1, wherein the cavity means is filled with air.

9. A liquid sensor according to claim 1 wherein the light source is located on said straight line between 70% and 80% of the radius of said circle distant from the said intersection point with said symmetry axis.

10. A liquid sensor according to claim 1 wherein the light source is located on said straight line at substantially 75% of the radius of said circle distant from said intersection point with said symmetry axis.

11. A liquid sensor according to claim 1 wherein the light sensor is located on said straight line between 60% and 70% of the radius of said circle distant from said intersection point with said symmetry axis.

12. A liquid sensor according to claim 1 wherein the light sensor is located on said straight line at substantially 65% of the radius of said circle distant from said intersection point with said symmetry axis.

13. A method of manufacturing a liquid sensor characterized by the following steps: molding or otherwise forming a support means with at least one recess for accommodating one or more semiconductor components; attaching a semiconductor light source and a semiconductor light detector into one or more recesses in the support means; securing the support means in relation to any optical element of hemispherical, or generally hemispherical shape; and locating the light source and the light detector on a place parallel to and closely spaced to a major plane of the optical element, said major plane constituting a cross-section of substantially maximum area of the optical element and in a base region thereof, and locating the light source and the light detector in a straight line passing through a symmetry axis of the optical element and parallel to a diameter of a circle described by the optical element in its major plane, the light source and the light detector being located on said straight line at different distances from an intersection point with said symmetry axis of the optical element, such that the optical element is able to receive light output from the light source and to transmit the light towards an arcutate exterior boundary of the optical element, and the optical element is also able to transmit light which is reflected at its arcuate exterior boundary in the absence of liquid at the exterior of the optical element and to direct it towards an inlet port of the light detector, and whereby the sensor comprises enclosed, gas-filled cavity means accommodating the light source and the light sensor.

14. A method according to claim 13, characterised by forming cavity means comprising a cavity to accommodate the light source and a separate cavity to accommodate the light detector.

15. A method according to claim 13, characterised by forming cavity means located intermediate the optical element and the semiconductor light source and detector, to accommodate electrical connections of the source and detector.

16. A method according to claim 13, characterised by locating the light source further from the intersection point than the light detector.

17. A method according to claim 13, further comprising locating the light source and light sensor on said straight line at a distance from said intersection point with said symmetry axis in the range 60% to 80% of a radius of said circle.

18. A method according to claim 13, further comprising locating the light source on said straight line between 70% and 80% of the radius distant from said intersection point with said symmetry axis.

19. A method according to claim 13, further comprising locating the light source on said straight line at substantially 75% of the radius of said circle distant from said intersection point with said symmetry axis.

20. A method according to claim 13, further comprising locating the light sensor between 60% and 70% of the radius of said circle distant from said intersection point with said symmetry axis.

21. A method according to claim 13, further comprising locating the light sensor on said straight line at substantially 65% of the radius of said circle distant from said intersection point with said symmetry axis.

* * * * *